2,798,097

PRODUCTION OF ALCOHOLS AND ETHERS

William P. Hettinger, Jr., Dolton, and Henry Erickson, Park Forest, Ill., assignors to Sinclair Refining Company, New York, N. Y., a corporation of Maine No Drawing. Application June 10, 1955, Serial No. 514,716

1 Claim. (Cl. 260—614)

Our invention relates to an improved method for the hydration of monoolefin hydrocarbons.

It is old in the art to hydrate monoolefin hydrocarbons, particularly those containing from 2 to 4 carbon atoms, to produce oxygenated products which are generally alcohols or ethers and polymers. For example, propylene has thus been hydrated to produce isopropyl alcohol, diisopropyl ether and polypropylene. The relative proportions of ether and alcohol produced depend upon the reaction conditions which are used, and the amount of polymer produced is generally minor. As catalysts for the hydration reaction, sulfuric acid and phosphoric acid have been suggested.

In accordance with our present invention, we have devised an improved process for the hydration of monoolefin hydrocarbons containing from 2 to 4 carbon atoms which involves the use as the hydration catalyst of one or more aqueous, inorganic, metal-containing acids of from 20 to 70 percent by weight strength. Such acids are particularly adapted for use as catalysts in the hydration reaction because they are stable, non-vaporizable and at the same time easily recovered.

As a specific illustration of an operation falling within the scope of our invention, one thousand pounds per hour of a liquid mixed propane-propylene feed containing 65 percent by weight of propylene is introduced into the bottom of a tower packed with about 80 cubic feet of stoneware Raschig rings. The tower is operated at a pressure of 750 p. s. i. g. and at a temperature of 300° F. Lean acid containing 35 percent by weight of chromic acid is introduced into the top of the tower at the rate of 2,000 pounds per hour. A lean mixture of propylene and propane is withdrawn from the top of the tower and from the bottom of the tower there is withdrawn fat acid. The fat acid is admixed with steam in the amount of approximately 100 pounds per hour, the steam having a temperature of about 350° F. The mixture is then introduced into a vessel maintained at about atmospheric pressure and 300° F. In this vessel a mixture of propyl alcohol, isopropyl alcohol, isopropyl ether and polymer is released from the fat acid and is withdrawn overhead, forming lean acid which is pumped through a heater and then into the top of the packed tower as already described. The amount of steam admixed with the fat acid is adjusted so as to maintain the composition of the lean acid at about 35 percent by weight chromic acid.

Various modifications can be made in the process just described to provide other embodiments which fall within the scope of our invention. For example, instead of the mixed propane-propylene feed there can be substituted pure propylene or propane-propylene mixtures containing as little as about 25 percent by weight of propylene. In addition, ethane-ethylene mixtures or butane-butylene mixtures similar to the propane-propylene mixtures can be utilized, as can also pure ethylene or a pure butylene. Mixtures containing two or more olefins are also useful feeds. In the tower in which the lean acid and monoolefin are reacted, a wide variety of temperatures and pressures can be used, the reaction temperature generally being within the range from about 250 to 600° F. and the pressure generally being within the range from about 500 to 2,000 p. s. i. g.

Various other aqueous inorganic metal-containing acids can be substituted for the chromic acid utilized in the specific illustration, among them being tungstic acid, molybdic acid, boric acid, chloroplatinic acid, fluosilicic acid, phosphotungstic acid, silicotungstic acid, and the like. In general, the aqueous lean acid introduced into the top of the packed tower will have an acid concentration of from about 20 to 70 percent by weight. Under certain operating conditions, due to low solubility, the acid may be in suspension as well as in solution in the water. Certain of these acids can be fed to the reactor as solids which dissolve under the conditions of the reaction.

In the specific illustration, the reaction between the monoolefin and water was conducted in a packed tower, but the particular apparatus used is not an essential part of our invention. For example, in place of a packed tower the reaction can be carried out in a stirred autoclave or in a centrifuge contactor, for example. Moreover, the step in which the alcohol, ether and polymer are released from the fat acid, thereby forming the lean acid for recycle, can be conducted, if desired, with the aid of a vacuum or by blowing the fat acid with nitrogen, propane or other inert gases, or by a solvent extraction operation employing as a solvent a hydrocarbon, for example, propane, or by preparation of the acid by lowering the temperature of the solution.

We claim:

A method of producing propyl alcohols, ethers and polymer comprising introducing a liquid propane-propylene feed containing about 65 percent by weight of propylene to the bottom of a tower at a rate of about 1,000 pounds per hour, said tower being operated at a pressure of about 750 p. s. i. g. and a temperature of about 300° F. introducing lean acid containing about 35 percent by weight of chromic acid at the top of said tower at a rate of about 2,000 pounds per hour, withdrawing a lean mixture of propylene and propane from the top of said tower and a fat acid mixture from the bottom of said tower, admixing steam at a temperature of about 350° F. with said fat acid mixture, introducing the resulting aqueous mixture into a vessel being maintained at about atmospheric pressure and 300° F., withdrawing overhead from said vessel a mixture of propyl alcohols, ethers, and polymer, and returning remaining lean acid to said tower.

References Cited in the file of this patent

UNITED STATES PATENTS

| | | |
|---|---|---|
| 2,070,258 | Coleman et al. | Feb. 9, 1937 |
| 2,162,913 | Eversole et al. | June 20, 1939 |